Jan. 16, 1968   M. S. CRANE   3,363,469
SEGMENTED MEASURING CUP
Filed March 29, 1966
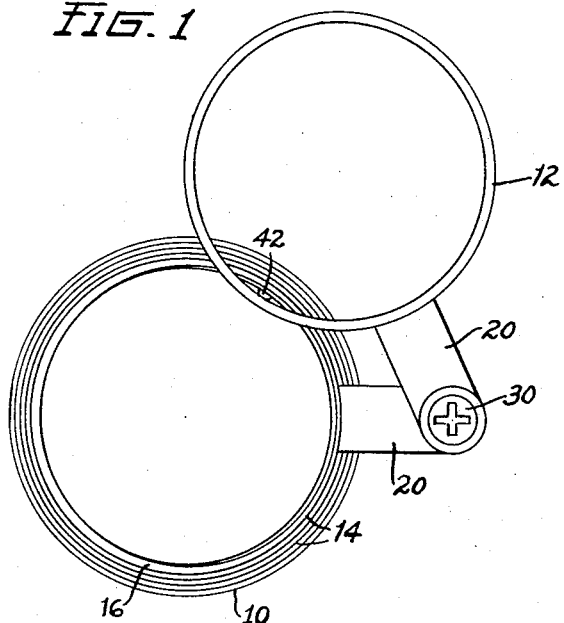
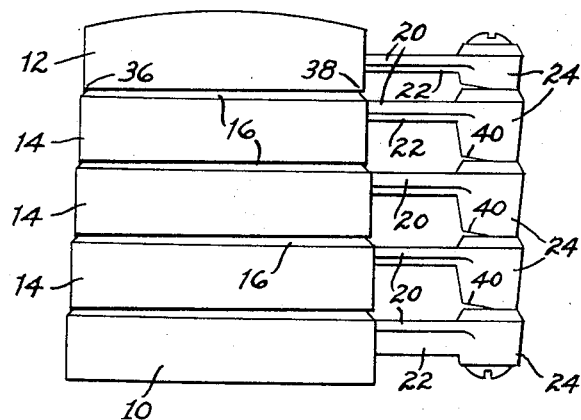
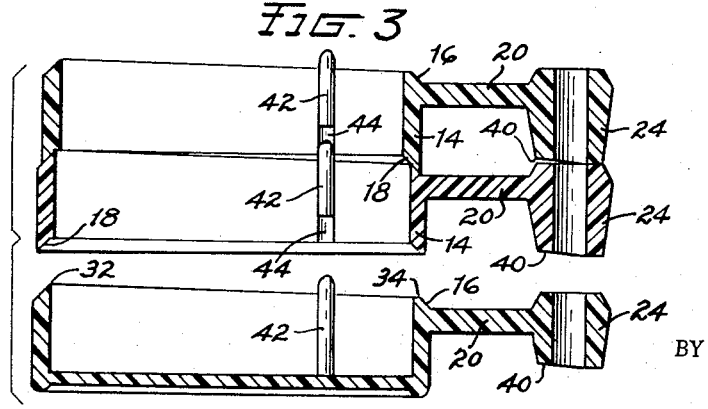
INVENTOR.
MOSE S. CRANE.
BY
Wallace P. Lamb
ATTORNEY.

United States Patent Office 3,363,469
Patented Jan. 16, 1968

3,363,469
SEGMENTED MEASURING CUP
Mose S. Crane, 21410 Santa Clara,
Detroit, Mich. 48219
Filed Mar. 29, 1966, Ser. No. 538,392
2 Claims. (Cl. 73—429)

ABSTRACT OF THE DISCLOSURE

The disclosure includes a first plurality of cup-forming tubular members stacked on beveled ends thereof and a plurality of handle-forming tubular members connected respectively to the cup-forming tubular members by individual arms. A tensioned coil spring extends through the handle-forming tubular members and yieldingly holds them together and also yieldingly holds the cup-forming tubular members together. The aforementioned beveled engaging ends of the cup-forming members are angularly disposed to insure that the force of the spring will be effective to maintain engagement of the cup-forming tubular members at the most remote point from the spring or point diametrically opposite the spring.

*Summary of the invention*

The invention resides in the provision of a segmented cup formed of tubular segments which are not so loosely held together that they may be accidentally displaced one from another, but yet may be readily swiveled about the axis of the handle to sweep off a measured amount of material above a desired level in the cup. To this end, the cup-forming tubular segments have their beveled engaging ends inclined to the horizontal so that the beveled edges will engage at the remotest points from a spring within the handle, aided by similar inclined ends of the tubular segments which form the handle.

This invention relates generally to measuring cups and particularly to cups for measuring granular, powdered or other dry materials.

It is the principal object of the invention to provide improvements in the measuring cup of my Patent No. 2,787,162, issued Apr. 2, 1957, entitled, Segmented Measuring Cup.

Specifically it is an object of my invention to provide in a segmented dry measure cup in which one or more of the segments may be pivoted relative to others to sweep off excess material above a desired level, an improved resilient connection between the segments and a cup handle to yieldably hold the segments normally cooperating to form substantially tight joints between the segments.

In connection with the next preceding object, it is an object of the invention to effect tight overlapping joints at the cup segments while at the same time providing for ease of displacement of one or more of the segments in the leveling off operation.

A more specific object of the invention resides in the provision of a measuring cup structure of the above mentioned character in which a helical spring located in the handle of the cup functions to yieldingly hold the cup segments together and also functions as a pintle for the individually displaceable segments.

Other objects of the invention will become apparent from the following description, taken in connection with the accompanying drawing in which:

FIG. 1 is a plan view of my improved measuring cup embodying features of the invention;

FIG. 2 is a side view of the cup;

FIG. 3 is an enlarged fragmentary sectional view, with the bottom section removed, and FIG. 4 is an enlarged vertical view of the cup handle shown partly in elevation and partly in section.

Referring to the drawings by characters of reference, the measuring cup shown comprises a plurality of tubular members or segments including a bottom segment 10, a top segment 12 and three intermediate segments 14. As shown the segments 10 and 14 each has its upper edge provided with an external bevel, as at 16, and the lower edges of segments 12 and 14 are provided with inwardly facing bevels, as at 18. When the cup segments are in their normal positions, the bevel edges of adjacent segments are in overlapping relationship forming joints such that the segments are supported in stacked or nested relation. Preferably the inner and outer diameters of the cup segments are successively of slightly lesser diameter from the bottom segment 10 to the top 12, as shown.

The cup segments 10, 12 and 14 are provided respectively with radially outwardly extending arms 20 which are preferably ribbed, as at 22, to enhance the rigidity of the arms. The arms 20 are in overlying aligned relationship when the segments are in their normal or nested relationship and on the outer ends of each arm are integral open-ended tubular members 24 which are also in vertical alignment. Collectively the tubular members 24 form a handle for the cup. As indicated, each of the segments is preferably made of a plastic material which may be any of the well known resins base or other suitably moldable material.

Within the hollow handle formed by the tubular members 24, I provide a stiff helical spring 26, wound with its convolutions in relatively close relationship. Screws 28 have heads 30 which abut the end ones 24 of the tubular handle sections and the threaded shanks of the screws 28 screwthread into end portions of the spring 26. By rotating the screws, such as by means of a screw driver, the spring 26 is tensioned to draw the tubular members 24 together and through the arms 20, yieldingly hold the cup segments 10, 12 and 14 in nested relationship shown in FIG. 2, for example.

In order to insure that the force of the spring 26 will be effective in urging the cup segments into engagement at remote points of their bevel edges diametrically opposite the handle, I form the cup segments so that said remote points are higher than other points along the bevel edge, the lowest points along the bevel edges being those which are closest to the spring 26. To accomplish this, I make the upper bevel edge 16 of the bottom segment 10 angularly disposed slightly to the horizontal, extending downwardly from the remotest point 32 from the spring 26 to a point 34 nearest the spring. The angle of the beveled edge may be about one-half degree. The same angle is provided on the lower beveled edge of the top segment 12 of the cup, but is reversed in the sense that the bevel edge extends upwardly from its remotest point 36 from the spring 26 to the closest point 38 to the spring as seen in FIG. 2. Also, this angle is provided on the top and bottom bevel edges of the three intermediate cup segments 14. As illustrated in FIG. 3, the top and bottom edges of each of the intermediate cup segments 14 converge from corresponding remote points of the bevels from the spring toward the spring. The consequence of this construction is the assurance that the cup segments will nest properly under the force of the spring 26 and also one or more of the segments 12 and 14 may be readily displaced in the leveling of the material being measured, without the exercise of undesirable force on the part of the user. Further, I prefer to relieve, as at 40, the lower ends of each of the handle tubular members 24 by making about half of the surface area toward the cup segments angularly disposed to the horizontal at an angle of about three degrees. This aids application of the spring force to the proper nesting of the cup segments and also reduces friction between the tubular members 24.

As shown in FIGS. 1 and 3, each of the cup segments is provided on its inner wall with a stop member 42 to aid in aligning the segments in nesting relationship and also to limit angular displacement of one or more segments when pivoted to level or sweep off the excess material. The stop members 42 are preferably formed in the molding operation and each has a vertical recess 44, except the bottom segment, to receive the upper end of the stop member carried by the next lower segment.

While I have shown and described my improved measuring cup in considerable detail, it is to be understood that many changes and variations thereof may be made without departing from the spirit and scope of the invention.

I claim:

1. A measuring cup comprising a first plurality of tubular members, each of said tubular members having a beveled edge forming a socket to receive an edge of an adjacent member, one of the end tubular members having a closure member forming the bottom wall of the cup, a plurality of rigid arms joined respectively to said tubular members and extending radially outwardly therefrom, a second plurality of stacked tubular members respectively joined to the outer ends of said arms and aligned axially to form a hollow handle, and a tensioned helical spring within said hollow handle and having its ends connected to the end members of said stacked tubular members, thereby yieldably holding the tubular members of each said pluralities of tubular members together, said lower edges of said first plurality of tubular members having inwardly facing bevels to receive outer facing bevel edges of adjacent ones of said tubular members, and with the opposed edges angularly disposed and diverging from each other toward said handle.

2. A measuring cup as defined by claim 1 in which at least one of the opposed adjacent ends of said second plurality of handle-forming tubular members has a tapered portion diverging with respect to the opposed end of the adjacent tubular member and toward said cup-forming tubular members to effect a snug fitting of said cup-forming tubular members by said spring.

References Cited

UNITED STATES PATENTS

| | | | |
|---|---|---|---|
| 2,787,162 | 4/1957 | Crane | 73—429 |
| 3,030,812 | 4/1962 | Lutz | 73—426 |

DAVID SCHONBERG, *Primary Examiner.*

LOUIS PRINCE, *Examiner.*

D. E. CORR, *Assistant Examiner.*